United States Patent
Gyllenhammar et al.

(10) Patent No.: US 12,377,837 B2
(45) Date of Patent: *Aug. 5, 2025

(54) PATH PLANNING IN AUTONOMOUS DRIVING ENVIRONMENTS

(71) Applicant: ZENUITY AB, Gothenburg (SE)

(72) Inventors: Magnus Gyllenhammar, Pixbo (SE); Håkan Sivencrona, Jörlanda (SE)

(73) Assignee: ZENUITY AB, Gothenburg (SE)

( * ) Notice: Subject to any disclaimer, the term of this patent is extended or adjusted under 35 U.S.C. 154(b) by 504 days.

This patent is subject to a terminal disclaimer.

(21) Appl. No.: 17/477,906

(22) Filed: Sep. 17, 2021

(65) Prior Publication Data

US 2022/0089151 A1     Mar. 24, 2022

(30) Foreign Application Priority Data

Sep. 18, 2020   (EP) ..................................... 20196798

(51) Int. Cl.
| | |
|---|---|
| *B60W 30/09* | (2012.01) |
| *B60W 60/00* | (2020.01) |
| *G01C 21/34* | (2006.01) |
| *G08G 1/16* | (2006.01) |

(52) U.S. Cl.
CPC ........ *B60W 30/09* (2013.01); *B60W 60/0011* (2020.02); *G08G 1/166* (2013.01); *G01C 21/3461* (2013.01)

(58) Field of Classification Search
CPC .. B60W 30/09; B60W 60/0011; G08G 1/166; G01C 21/3461; G01C 21/346
See application file for complete search history.

(56) References Cited

U.S. PATENT DOCUMENTS

| | | | |
|---|---|---|---|
| 10,571,908 B2 * | 2/2020 | Joyce | G07C 5/008 |
| 10,955,250 B2 * | 3/2021 | Leone | G01C 21/3415 |
| 2017/0089710 A1 * | 3/2017 | Slusar | G01C 21/3833 |

(Continued)

FOREIGN PATENT DOCUMENTS

| | | |
|---|---|---|
| EP | 3474254 A1 | 4/2019 |
| EP | 3543864 A1 | 9/2019 |

OTHER PUBLICATIONS

Extended European Search Report mailed Mar. 4, 2021 for European Patent Application No. 20196798.1, 5 pages.

*Primary Examiner* — Tarek Elarabi
(74) *Attorney, Agent, or Firm* — Sage Patent Group

(57) ABSTRACT

A path planning method and system for a vehicle. The method includes obtaining risk map of a surrounding environment of vehicle. Risk map is formed based on an actuation capability of the vehicle and location of free-space areas in the surrounding environment, actuation capability including uncertainty estimation for actuation capability and the location of free-space areas comprising an uncertainty estimation for the estimated location of free-space areas. Risk map includes risk parameter for each of a plurality of area segments included in the surrounding environment of the vehicle. Obtaining at least one candidate path for vehicle, determining total risk value for each candidate path based on risk parameters of a set of area segments intersected by the at least one path, selecting a candidate path, of at least one candidate path, fulfilling a risk value criterion, and generating, at an output, a first signal indicative of selected candidate path.

11 Claims, 8 Drawing Sheets

(56) References Cited

U.S. PATENT DOCUMENTS

| | | | |
|---|---|---|---|
| 2017/0277195 A1* | 9/2017 | Frazzoli | B60W 30/0956 |
| 2018/0046182 A1* | 2/2018 | Joyce | G01C 21/3453 |
| 2019/0154453 A1* | 5/2019 | Leone | B60W 30/188 |
| 2019/0333386 A1* | 10/2019 | Horita | G08G 1/166 |
| 2020/0174481 A1* | 6/2020 | Van Heukelom | G06N 3/045 |
| 2022/0350336 A1* | 11/2022 | Gyllenhammar | G05D 1/0221 |

* cited by examiner

PATH PLANNING IN AUTONOMOUS DRIVING ENVIRONMENTS

CROSS-REFERENCE TO RELATED APPLICATIONS

The present application for patent claims priority to European Patent Office Application Ser. No. 20196798.1, entitled "PATH PLANNING IN AUTONOMOUS DRIVING ENVIRONMENTS" filed on Sep. 18, 2020, assigned to the assignee hereof, and expressly incorporated herein by reference.

TECHNICAL FIELD OF THE INVENTION

The present disclosure relates to automated driving systems, and in particular to risk estimation for vehicles equipped with an automated driving system.

BACKGROUND

During these last few years, the development of autonomous vehicles has exploded and many different solutions are being explored. An increasing number of modern vehicles have advanced driver-assistance systems (ADAS) to increase vehicle safety and more generally road safety. ADAS—which for instance may be represented by adaptive cruise control, ACC, collision avoidance system, forward collision warning, etc.—are electronic systems that may aid a vehicle driver while driving. Today, development is ongoing in both ADAS as well as Autonomous Driving (AD), within a number of different technical areas within these fields. ADAS and AD will herein be referred to under the common term Automated Driving System (ADS) corresponding to all of the different levels of automation as for example defined by the SAE J3016 levels (0-5) of driving automation.

Accordingly, in a not too distant future, ADS solutions will to a greater extent find their way into modern vehicles. An ADS may be construed as a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, as well as obstacles and/or relevant signage.

ADS features as described above are, however, bound to be required to function with a high integrity to provide sufficiently low risk for the vehicle occupant(s) as well as their surrounding environments. Ensuring that the risk is sufficiently low may require intractable amounts of data for statistical proofs, and would, according to an example, take e.g. approximately a hundred vehicles to drive continuously for five centuries, to acquire. There are several approaches to minimize the risk of the ADS features before they are launched onto public roads. However, on top of this, it is generally believed that the ADS features should be monitored once in the field, in order to ensure that they adhere to required safety levels.

Assuring the safety of an ADS is one of the central challenges in being able to release such systems to the market. Safety can be viewed as the absence of risk and this is also one of the most tractable ways of viewing it. One of the largest challenges with ADS is to ensure that the self-driving vehicle is able to safely plan and execute paths and/or trajectories.

In general, a conventional path planning system generates a target path for an autonomous vehicle from a given drivable area that is typically provided based on data from a perception system. The target path is assumed to be sent to a vehicle controller that computes steering angles and such that the vehicle follows the path.

There are multitudes of different research reports containing various approaches proposed in order to find and execute such a safe and reliable path, and there is further entire research-fields dedicated to finding the optimal path given a set of different constraints. The analytical approaches focus on finding paths given the predictions and states of objects surrounding the vehicle. There is yet another class of methods to obtain paths for a self-driving vehicle, relying on machine learning or deep neural network to do the work of picking a suitable path. Many of the currently known methods rely on detailed modelling of the surrounding environment to finally capture these models within a (complex) set of constraints of the following optimization problem of finding the optimal path. However, with increasingly complex operating situations and operational domains of the ADS finding and executing such "safe" paths might prove to be extremely difficult, if not impossible.

Moreover, when providing paths for execution by automated driving systems (ADSs) it is common to create one component or module, which provides a suggestion for a path and another component that checks if this path can be safely executed. The second checker-component is conventionally implemented using heuristics as this is one of the few ways to ascertain the integrity/safety of the component. One other approach is letting it rest on formal arguments or equations. However, the heuristic-based method requires that the team making the implementations is knowledgeable of all possible situations and further that no errors are done when determining the heuristics. As mentioned, with increasingly complex operating situations and operational domains of the ADS constructing such a complete set of heuristics that can check the path safety might prove to be an insurmountable amount of work. Similarly, formal methods fall under the same issues to account for all possible outcomes. For some solutions it has yet only been able to integrate one type of maneuver (longitudinal or lateral) for handling violations to their safety zone, as the combination has turned out to be difficult to formally show.

There is therefore a need in the art for new solutions for path planning methods and systems for autonomous and semi-autonomous vehicles, which are reliable, computationally efficient, and scalable as the operational situations of the ADS expand into scenarios that are more and more complex.

SUMMARY OF THE INVENTION

It is therefore an object of the present invention to provide a path planning method, a computer-readable storage medium, a path planning system, and a vehicle that alleviate all or at least some of the above-discussed drawbacks of presently known systems and methods.

Further, it is an object of the present invention to provide a path planning method, a computer-readable storage medium, a path planning system, and a vehicle.

This object is achieved by means of a path planning method, a computer-readable storage medium, a path planning system, and a vehicle as defined in the appended claims. The term exemplary is in the present context to be understood as serving as an instance, example or illustration.

According to a first aspect of the present invention, there is provided a path planning method for a vehicle. The method comprises obtaining a risk map of a surrounding environment of the vehicle. The risk map is formed based on an actuation capability of the vehicle and a location of free-space areas in the surrounding environment, the actuation capability including an uncertainty estimation for the actuation capability and the location of free-space areas comprising an uncertainty estimation for the estimated location of free-space areas. Moreover, the risk map comprises a risk parameter for each of a plurality of area segments comprised in the surrounding environment of the vehicle. The method further comprises obtaining at least one candidate path for the vehicle, determining a total risk value for each candidate path based on the risk parameters of a set of area segments intersected by the at least one path, selecting a candidate path, of the at least one candidate path, fulfilling one or more risk value criterion, and generating, at an output, a first signal indicative of the selected candidate path.

According to a second aspect of the present invention, there is provided a (non-transitory) computer-readable storage medium storing one or more programs configured to be executed by one or more processors of an in-vehicle processing system, the one or more programs comprising instructions for performing the method according to any one of the embodiments disclosed herein. With this aspect of the invention, similar advantages and preferred features are present as in the previously discussed first aspect of the invention.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to a third aspect of the present invention, there is provided a path planning system for a vehicle. The path planning system comprising control circuitry configured to obtain a risk map of a surrounding environment of the vehicle. The risk map is based on an actuation capability of the vehicle and a location of free-space areas in the surrounding environment, the actuation capability including an uncertainty estimation for the actuation capability and the location of free-space areas comprising an uncertainty estimation for the estimated location of free-space areas. Moreover, the risk map comprises a risk parameter for each of a plurality of area segments comprised in the surrounding environment of the vehicle. The control circuitry is further configured to obtain at least one candidate path for the vehicle, determine a total risk value for each candidate path based on the risk parameters of a set of area segments intersected by each candidate path, select a candidate path, of the at least one candidate path, fulfilling one or more risk value criterion, and to generate, at an output, a first signal indicative of the selected candidate path.

According to a fourth aspect of the present invention, there is provided a vehicle comprising an automated driving system (ADS), a perception system comprising at least one sensor configured to monitor a surrounding environment of the vehicle, a vehicle control system comprising at least one sensor configured to monitor an actuation capability of the vehicle, a localization system configured to monitor a geographical map position of the vehicle, and a path planning system according to any one of the embodiments disclosed herein. With this aspect of the invention, similar advantages and preferred features are present as in the previously discussed first aspect of the invention. With this aspect of the invention, similar advantages and preferred features are present as in the previously discussed first aspect of the invention.

Accordingly, the herein proposed path planning methods and systems inherently account for the risk associated with the current position and state of the ADS. Accounting for the risk implicitly (in this part of the system) through the risk map opens up for both the possibility of having a more flexible solution, as well as providing the optimal, but still risk mitigating path. One of the advantages of this approach is that the risk map associated with the models of the system as well as its surroundings can be readily updated with each update of the ADS. Thus, the methods outlined herein, to process and use the risk map for path planning, can be kept intact in spite of changes to the rest of the system or even where it is defined to operate.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF FIGURES

Further objects, features and advantages of embodiments of the invention will appear from the following detailed description, reference being made to the accompanying drawings, in which.

DETAILED DESCRIPTION

Figure 1:
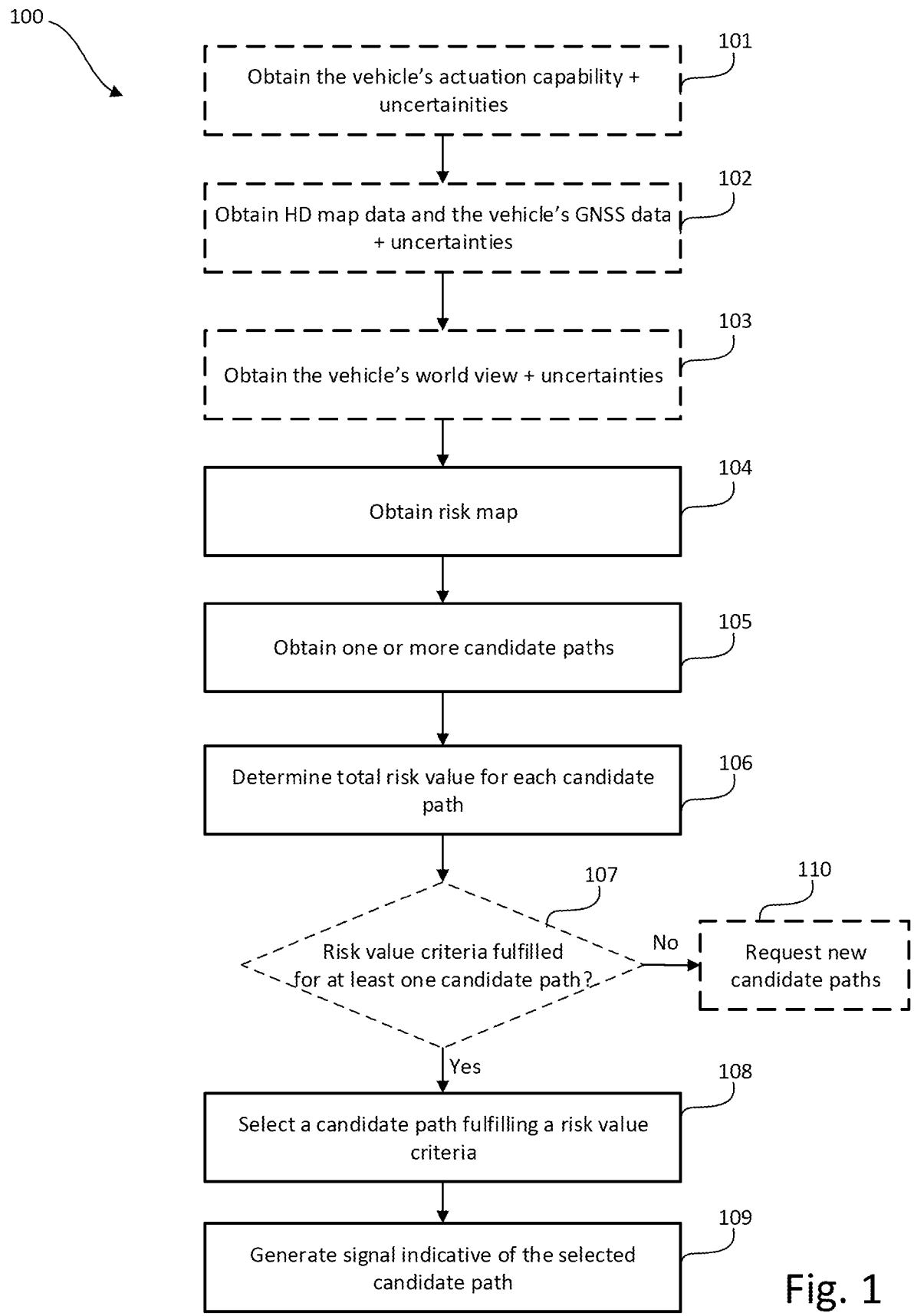
FIG. 1 is a schematic flow chart of a path planning method for autonomous or semi-autonomous vehicles in accordance with an embodiment of the present invention.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present invention is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

In the present context, a risk map estimates and quantifies a view of the "risk" across the ADS's surrounding (i.e., of the ego-vehicle's surroundings), and preferably includes sensor capabilities, uncertainties in detections and predictions as well as uncertainties in the available capabilities of the vehicle platform.

As mentioned in the background section, presently known path planning solutions for autonomous vehicles require immense amounts of manual work in order to be able to generate paths that can be deemed "safe". It should be noted that the term "safe" in the present context is to be understood as statistically safe above a probability threshold, e.g. a path may be considered safe if the probability of an accident for a path is determined to be less than once per 109 hours (ASIL D). In order to mitigate this need for manual work, it is herein proposed to use a real time risk map of the current situation that the ADS finds itself in as a checker instead. The risk map includes all the potential risk sources including the uncertainties of the measurements from the own sensors, the predictions of movements of available objects, the risk of new objects appearing as well as the capabilities of the vehicle platform that the ADS runs on. If the proposed path for the ADS accumulates sufficiently low risk if executed on the risk map it can be accepted. Thus, using the risk map as a checker will assure that the path is always of sufficiently low risk.

Moreover, the risk map can be extended with additional models in the same pace as an expansion across new operational domains of the ADS is conducted and in such a way provide accurate risk estimates. In such a way the risk map might be easier to maintain and is further providing a more general concept for checking the suggested paths for ADS s compared to the heuristic approach.

In more detail, the present invention proposes to use a risk map, which captures all the effects of both the surrounding environment, detections as well as predictions, together with uncertainties in the estimation of those surroundings and the uncertainties of the capabilities of the own vehicle. Rather than approaching the optimisation problem as a complex one constrained by a huge set of variables most of these are captured directly in the risk map. The challenge that is left is then to find the optimal path on the given risk map. Accordingly, this may lead to a more tractable and performant solution and furthermore, to a solution that is more easily extendable into new domains. As one gains more understanding of the world, within which the ADS operates, it is possible to append the models underpinning the system and feed them into the risk map to continue using the same method of finding "safe" paths.

One of the main problems with the conventional methods for formal path checking, is that they do not account for uncertainties. Further, since those models rely heavily on different parameters, like braking capabilities, to assess the validity of the suggested path (or current state) it is paramount that these parameters are correct. To the knowledge of the present inventors there are no suggestions for how to incorporate these aspects within the currently known models. The risk map on the other hand supplies all of these estimates inherently by including the uncertainties of all aspects of the ADS. Thus, using the risk map for path checking and planning not only may lower the needed implementation efforts when compared to formal or heuristic methods for path checking, but it may further include the dynamic uncertainties inherent to the operational environment of the ADS. The consequence is a more reliable automated path checking and planning solution.

Figure 4:
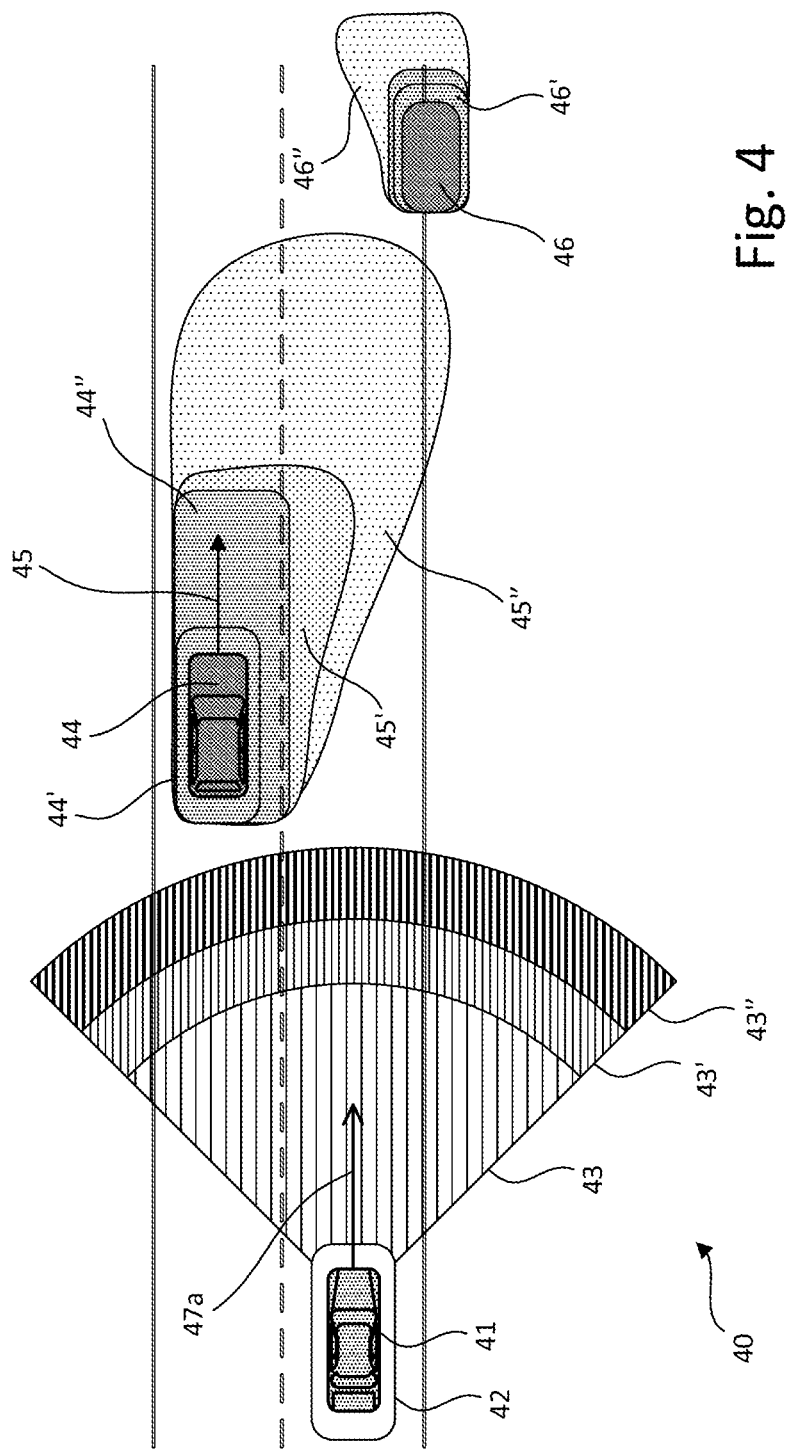
FIG. 4 is a schematic top view illustration of a risk map with some of the different components contributing to the risk map in accordance with an embodiment of the present invention.

To understand what paths that are safe to execute for the ADS is a critical component to drive the ADS safely. In any given situation the ADS is exposed to a plethora of risks and uncertainties. Quantifying each such risk and uncertainty across the current perceived state of the world provides the ADS with what can be called a risk map. A schematic example of a risk map is shown in FIG. 4. Such a risk map, where each position around the ADS is associated with a risk, can be used to assess the risk of traversing the positions on the map. Thus, given a path, the risk map can be used to assess the risk of that path. Consequently, the safety (i.e. lack of risk) of a path may in some embodiments be calculated using the risk map.

Moreover, in some embodiments the risk map provides input to find/identify the optimal path given additional quality criteria, such as e.g. comfort, and to ensure the risk level of the output (i.e. to make sure that the path fulfilling the quality criteria also fulfils one or more safety criteria). In some embodiments, the risk map provides input to find/identify path associated with the lowest risk value, i.e. to find a back-up path, where little-to-no regard may be given to certain quality criteria such as e.g. comfort. These two approaches can subsequently be combined to make up a holistic risk aware path planning system for the use in a vehicle.

FIG. 1 illustrates a schematic flow chart representation of a path planning method 100 in accordance with an embodiment of the present invention. The method 100 comprises obtaining 104 a risk map of a surrounding environment of the vehicle. The risk map is formed based on an actuation capability of the vehicle and a location of free-space areas in the surrounding environment, the actuation capability including an uncertainty estimation for the actuation capability and the location of free-space areas comprising an uncertainty estimation for the estimated location of free-space areas. Moreover, the obtained 104 risk map comprises a risk parameter for each of a plurality of area segments comprised in the surrounding environment of the vehicle.

The actuation capability of the vehicle may for example include one or more actuation parameters such as e.g. braking capacity, maximum steering angle, maximum acceleration capability, etc. including an uncertainty estimate for each parameter. The actuation capability and the associated uncertainty estimate(s) may be determined in real-time based on a predefined model given one or more real-time variables such as e.g. current speed, vehicle properties (vehicle dimensions, vehicle weight, etc.), road surface properties, and so forth, as readily understood by the skilled person in the art. The uncertainty estimates may be derived from predefined statistical models associated with each actuation parameters, where the actuation capability is given by the mean or mode value and the uncertainty estimate is given by e.g. one or two standard deviations above or below the mean.

The free-space areas may for example be derived from sensor data of one or more vehicle-mounted sensors configured to monitor the surrounding environment of the vehicle. Nevertheless, the sensor data may also originate from other sensors in the vicinity of the vehicle, e.g. sensors mounted on other vehicles or on infrastructure elements and obtained via a V2V or V2X communication network.

Free-space areas may in the present context be understood as areas in the surrounding environment of the ego-vehicle absent of objects (e.g. other vehicles, pedestrians, barriers, animals, bicycles, static objects, etc.). Thus, the obtained location of free-space areas may be understood as estimates of areas absent of external objects (static and dynamic objects) as well as an estimate of the uncertainty of this determination, i.e. the likelihood of the determined location of the free-space area actually being true.

Moreover, in some embodiments, the location of free-space areas comprises a position of external objects located in the surrounding environment of the ego-vehicle. The estimated position of the external objects may include uncertainties of the position of the external objects, estimated trajectories of any dynamic objects of the external objects and uncertainties of the estimated trajectories of the dynamic objects. However, in some embodiments the location of free-space areas is determined by a dedicated module of the vehicle, where the dedicated module is configured to obtain sensor data indicative of the surrounding environment of the vehicle, and to derive the location of the free-space areas with respect to the vehicle based on the sensor data. Thus, there does not have to be an intermediate step or layer where objects are detected before the location of the free-space area is obtained, i.e. the "free-space area" may be obtained directly. For example, a signal emitted by a Lidar may propagate through space for a certain distance before it is reflected from some surface, then this area between the Lidar and the surface may be defined as a "free-space area" without any operation or step to define the surface that the signal was reflected from.

Accordingly, in some embodiments the method 100 may further comprise a step of obtaining 101 (sensor) data indicative of the actuation capability of the vehicle and the uncertainty estimation of the actuation capability. Moreover, the method may further comprise obtaining 103 data indicative of the location of free-space areas and the uncertainty estimation for the estimated location of free-space areas. Optionally, the method 100 may further comprise obtaining 103 (sensor) data indicative of a position of external objects in the surrounding environment of the vehicle relative to the vehicle and uncertainties of the position of the external objects, trajectories of any dynamic objects of the external objects and uncertainties of the estimated trajectories of the dynamic objects, and a geographical position of the vehicle, the geographical position including an uncertainty estimation of the estimated geographical position of the vehicle.

In some embodiments, the method 100 further comprises obtaining 102 map data comprising HD map information of the surrounding environment and a geographical position of the vehicle, where the estimated geographical position includes an uncertainty estimation of the estimated geographical position of the vehicle.

Accordingly, in some embodiments, the step of obtaining 104 the risk map comprises forming a risk map of the surrounding environment of the ego-vehicle based on the obtained 101 actuation capability, the obtained 102 map data, and the obtained 103 location of free-space areas. Thus, one can utilize the ADS's readily available functionality of estimating the "free space" in the surrounding area of the ego-vehicle and the functionality of estimating the operating capabilities of the vehicle platform (both of which are generally used for making decisions and controlling the vehicle), and then use this functionality in order to generate a risk map.

Moving on, as mentioned, the risk map comprises a risk parameter for each of a plurality of area segments comprised in the surrounding environment of the vehicle. Each risk parameter may for example be indicative of a probability of an accident event or of a probability of violating any predefined safety margin or threshold if the vehicle were to occupy an associated area segment, or more specifically for a planned path of the vehicle to intersect that area segment. In a simplified example, if a first area segment is completely within an area occupied by an external vehicle, then that first area segment may have a risk parameter indicating that the first area segment is a "high risk" segment. This is at least partly based on the logical reasoning that if the vehicle's planned path were to intersect that segment, one can assume that there is a relatively high probability of collision with the external vehicle. Analogously, if a second area segment is completely within a drivable road segment void of any external objects, then that second area segment may have a risk parameter indicating that the second area segment is a "low risk" segment.

The term "probability of violating a predefined safety margin or threshold" may for example be an estimate of a probability of violating a predefined minimum distance to other vehicles. In more detail, one can assume that the probability of violating such a safety threshold increases when the planned path of the vehicle involves a take-over maneuverer, or maneuvering through dense traffic as compared to driving on an empty highway. Thus, given some statistical model indicative of certain scenarios occurring in the operational design domain (ODD) of the vehicle, one can estimate the probability of an external vehicle performing an unexpected maneuver which would cause a violation of the predefined minimum distance to a lead vehicle, and also estimate the probabilities of this specific action taking place on various scenarios. As mentioned, one can assume that there is a higher risk of being exposed to such "unexpected maneuvers" in dense city traffic than on empty highways. In other words, the risk parameters does not necessarily have to indicate a probability of an accident event, but may be defined on other metrics such as exemplified above. Other examples include other quality metrics such as distance to road edge, magnitude of jerk (e.g. lateral acceleration), and so forth.

Stated differently, these high risk/low risk segments may be quantified to a probability score using statistical modelling based on historical data that has been collected over time from real driving scenarios, e.g. if the ego-vehicle's planned path were to intersect segment A, then the historical data indicated that the probability of collision/violation of safety threshold is X. In more detail, as mentioned, these statistical models may be more or less complex taking into account various factors such as time of day, day of the week, distance to other vehicles, angle relative to other vehicle, type of other vehicle, speed of other vehicle, speed of ego-vehicle, geographical position, and so forth. For example, one may statistically conclude that there is a higher probability of collision in an area segment 1 meter behind a vehicle than in an area segment 50 meters behind the same vehicle. Thus, the area segment close to the rear of the external vehicle will be given a higher risk value or a risk parameter indicative of the "higher risk", than the area segments far away from the external vehicle.

Further, the method 100 comprises obtaining 105 at least one candidate path for the vehicle. In the present context, the terms path and trajectory are used interchangeably even though one may consider a trajectory to be a time-dependent path. Thus, in some embodiments, the method comprises obtaining 105 at least one candidate trajectory. The method 100 further comprises, determining 106 a total risk value for each candidate path/trajectory based on the risk parameters of a set of area segments intersected by the at least one path.

The total risk value of each candidate path may be determined 106 in a number of ways. For example, in some embodiments, the step of determining 106 the total risk value of each candidate path comprises aggregating the risk parameters of the set of area segments intersected by each candidate path, and determining 106 the total risk value for each candidate path based on the aggregated risk parameters. In other words, one may determine a risk parameter integral of each candidate path on the risk map.

In some embodiments, the step of determining 106 the total risk value of each candidate path comprises analysing a risk gradient of each candidate path, where the risk gradient is indicative of a change in the risk parameters of adjacent area segments intersected by each candidate path. Then, the total risk value of each candidate path is determined 106 based on the analysed risk gradient of each respective candidate path. In some embodiments, the step of determining 106 the total risk value of each candidate path comprises determining the area segment having the highest risk parameter intersected by each candidate path in order to obtain a value of a highest risk zone entered by each candidate path. Then, the total risk value of each candidate path is determined 106 based on the obtained value of the highest risk zone entered by each respective candidate path. These three exemplified ways of determining 106 the total risk value of each candidate path may be used as alternative ways or in various (weighted) combinations with each other. Further details regarding the determination of the total risk value of each candidate path are given in reference to FIG. 7.

Moving on, the method 100 further comprises selecting a candidate path from the one or more obtained 105 candidate paths that fulfils a risk value criterion. The risk value criterion may for example be a maximum risk value threshold. Thus, a candidate path fulfilling a risk value criterion may be a candidate path having a total risk value below the maximum risk value threshold. The method 107 may further comprise a preceding step of comparing the total risk value of each obtained 105 candidate path with the risk value criterion, and base the selection 107 upon this comparison. However, if no candidate path is fulfilling the risk value criterion, the method 100 may further comprise a step of generating 110, at an output, a request signal indicative of a request for new candidate paths. However, if a candidate path fulfilling the risk value criterion is identified/selected 108, the method 100 further comprises generating 109, at an output, a first signal indicative of the identified/selected 108 candidate path.

Further, in some embodiments, the step of obtaining 105 each candidate path comprises generating at least one path from a starting position of the vehicle to a goal position of the vehicle, each generated path having a set of quality parameters. The quality parameters may for example include length of the path, offset from lane centre, comfort parameters (such as e.g. longitudinal acceleration, lateral acceleration, jerk, etc.), and so forth. Accordingly, the method 100 may further comprise comparing the quality parameters of each path with a set of quality criteria in order to generate at least one candidate path having a set of quality parameters fulfilling the set of quality criteria. The quality criteria may define threshold values or ranges for the quality parameters.

Moreover, in some embodiments, the risk value criterion is a maximum risk value threshold and the set of quality parameters of each path candidate path are indicative of a quality score of each candidate path. Thus, the step of selecting 108 at least one candidate path fulfilling the risk value criterion comprises selecting the candidate path having the highest quality score and having a total risk value below the maximum risk value threshold. Thereby, the selected candidate path is not only evaluated based on its risk parameters but also upon additional constraints upon the risk map in order to generate an optimal path to be executed by the ADS.

Still further, in some embodiments, the method 100 further comprises determining a back-up path from the at least one candidate path, where the back-up path is the candidate path having the lowest total risk value relative to any other candidate path of the one or more obtained candidate paths. In other words, in some embodiments, the risk value criterion may be "selecting the candidate path having the lowest total risk value". Thus, the risk value criterion need not be a maximum threshold value, but may be defined as selecting a smallest risk value out of a set of risk values. The method 100 may further comprise generating, at an output, a second signal indicative of the determined back-up path. It should be noted that the first signal and second signal may be the same signal, i.e. the output may be a single signal indicative of the selected candidate path (i.e. a candidate path fulfilling quality constraints as well as risk value constraints), and of the back-up path (i.e. lowest risk candidate path). In some embodiments, these paths (the candidate path fulfilling quality constraints as well as risk value constraints and the lowest risk candidate path) may be the same path.

Executable instructions for performing these functions are, optionally, included in a non-transitory computer-readable storage medium or other computer program product configured for execution by one or more processors.

Figure 2:
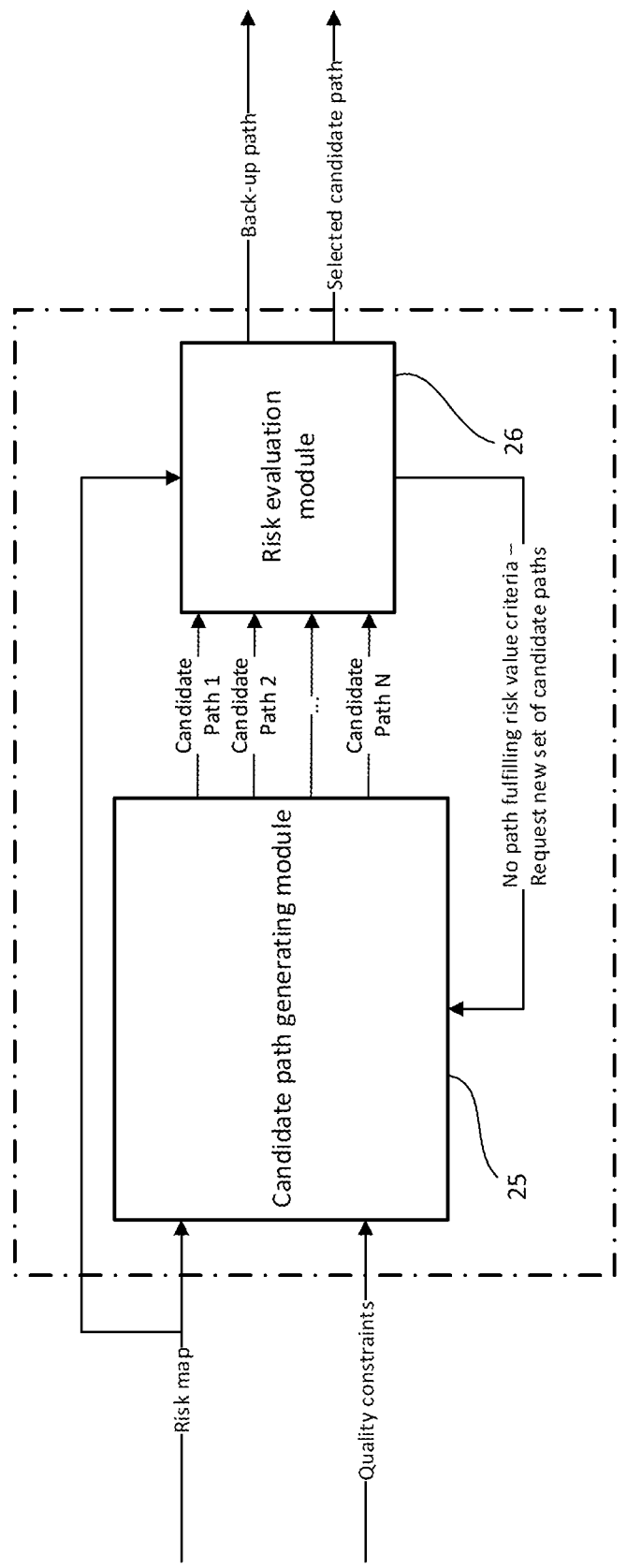
FIG. 2 is a schematic block diagram representation of a path planning system in accordance with an embodiment of the present disclosure.

FIG. 2 is a schematic block diagram representation of a path planning system 10 for an autonomous or semi-autonomous vehicle. The risk map is supplied as input to the path planning system 10 together with additional quality constraints or criteria, such as e.g. comfort parameters. These inputs are processed by a path finder component/module 25, which may be a "black box", based on machine learning models or similar. Accordingly, the path finding component 25 outputs a set of candidate paths 1-N, all of which are subsequently assessed by a risk evaluation component/module 26 based on their risk level.

The risk evaluation module 26 is configured to determine a total risk value for each candidate path based on the risk parameters of a set of area segments intersected by each candidate path, and to select a candidate path, of the set of candidate paths 1-N, fulfilling a risk value criterion. The selected candidate path is subsequently output from the path planning system 10. However, if there are several candidate paths fulfilling the risk value criterion, the risk evaluation module 26 may be configured to output the candidate path having the highest quality score (with respect to the quality constraints) out of the several candidate paths fulfilling the risk value criterion. Thereby, the path planning system 10 effectively outputs the most "comfortable" path, that is still considered to be "safe". Alternatively, the risk evaluation module 26 may be configured to select and output the candidate path having the lowest total risk value while fulfilling a set of quality constraints/criteria. Thereby, the path planning system 10 effectively outputs a "comfortable" path, that is considered to be the "safest" out of the set of candidate paths 1-N.

In some embodiments, the risk evaluation module 26 is configured to determine a back-up path from the set of candidate paths 1-N, where the back-up path is the candidate path having the lowest total risk value relative to any other candidate path of the at least one candidate path. The back-up path is subsequently output from the system 10. Here, the back-up path is the candidate path optimised with respect to risk, and not against any quality constraints. Thus, the back-up path may be used as a "fall-back option" by the ADS if no other viable paths can be generated. Moreover, if none of the suggested candidate paths 1-N fulfils the risk value criterion, the risk evaluation module 26 may be configured to generate a request signal indicative of a request of a new set of candidate paths from the path generating module 25. This loop of supply and request of candidate paths may go on as long as the overall path request has not timed out.

Figure 3:
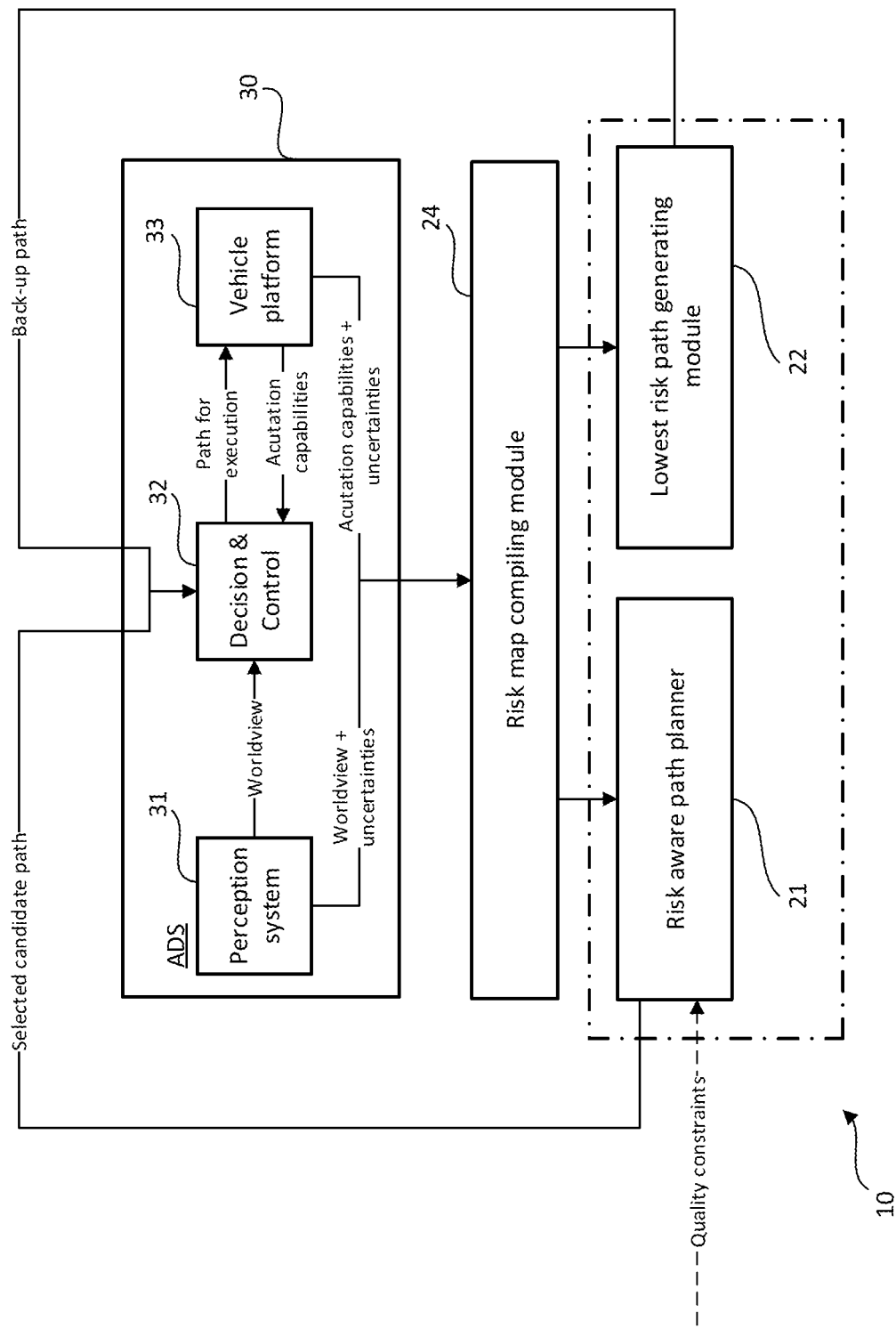
FIG. 3 is a schematic block diagram representation of a path planning system in co-operation with an Automated Driving System (ADS) in accordance with an embodiment of the present disclosure.

FIG. 3 is a schematic block diagram representation of a path planning system 10 in co-operation with an Automated Driving System (ADS) 30 in accordance with an embodiment of the present disclosure. As mentioned, the compiled risk map serves to quantify the risk that is present around the ADS 30 in each given moment. This map can then be used to find a suitable path for the ADS. Accordingly, firstly the risk map is compiled, by a risk map compiling module 24, from the detections and predictions including uncertainties from the perception system 31 and the capabilities and uncertainties reported by the vehicle platform 33. Then, the risk map is fed into a risk aware path finding system 21 which outputs a suggested path that might further have accounted for additional constraints (quality constraints) on top of the risk map.

Moreover, as a separate component the risk map might be used to really find the path with the lowest possible risk (i.e. the back-up path). How such a set-up may fit with the ADS 30 is depicted in FIG. 3. Again, the inputs from the ADS 30 are fed to compile the risk map. This time the risk map is processed by a component (lowest risk path generating module) 22, which is configured to find a viable path with the lowest possible risk. This low risk path is then fed back from the path planning system 10 to the ADS 30 as a backup path.

To find the lowest risk path the risk map could be used within an optimisation framework where the risk of the path works as the cost function. With a rigorous optimisation method this setup would then ensure to output the path with the lowest possible risk, given the current state of the system and its surroundings.

Accordingly, the two components of path finding 21, 22 described above may be combined into a complete risk aware path planning system 10 for the ADS 30. The two components/modules 21, 22 for path finding, namely the risk aware path planner 21 that finds an optimal path given additional constraints is run in parallel with the component/module 22 finding a viable lowest risk path used for backup. This system 10 may accordingly always provide a viable low risk path, but also explore to provide a path which further could fulfil additional performance related criteria (i.e. quality constraints). Since the backup path is present and this is optimised to be the best viable option (with respect to risk), the risk aware path planner 21 could basically supply any path to the decision and control block 32 of the ADS 30, which in turn could decide on using it or rely on the provided backup path.

Accordingly, the herein proposed path planning system 10 inherently accounts for the risk associated with the current position and state of the ADS 30. Accounting for the risk implicitly (in this part of the system) through the risk map opens up for both the possibility of having a more flexible solution, as well as providing the optimal, but still risk mitigating path. One of the advantages of this approach is that the risk map associated with the models of the system as well as its surroundings can be readily updated with each update of the ADS 30. Thus, the methods outlined herein, to process and use the risk map for path planning, can be kept intact in spite of changes to the rest of the system or even where it is defined to operate.

Figure 5:
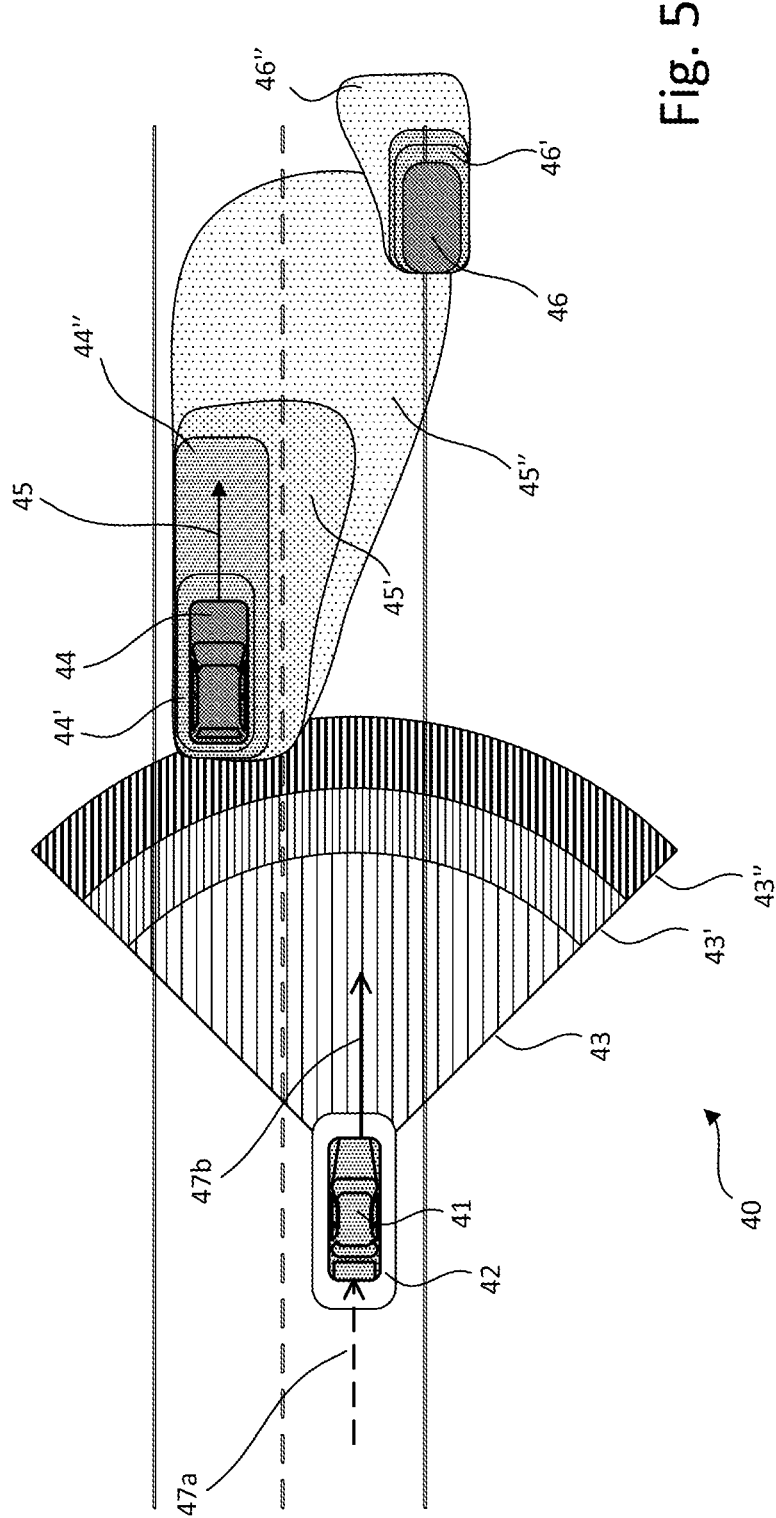
FIG. 5 is a schematic top view illustration of a risk map at a subsequent time step relative to the risk map illustrated in FIG. 4.

Moving on, FIGS. 4-5 are two schematic top view illustration of a risk map 40 with some example components 41-46" contributing to the risk map 40, at two consecutive time steps, in accordance with an embodiment of the present invention. Furthermore, the planned path for execution 47a-b of the ego-vehicle is indicated in the map 40. In more detail, dashed line arrows indicate the "planned path" 47a from a preceding time instance/sample and the currently planned and selected path 47b is indicated by the arrow in front of the vehicle.

Further, the risk map 40 comprises information indicative of an estimated braking capacity of the vehicle 43 including uncertainty estimation 43', 43" of the same. Further, the risk map 40 comprises a geographical position 41 of the ego-vehicle in the map, the uncertainty estimation 42 of the geographical position 41, a position of external objects 44, 46, uncertainties of the position of the external objects 44', 44", 46', trajectories 45 of dynamic objects 44 and uncertainties 45' 45" of the trajectories 45. The estimated uncertainties may for example be computed based on models (predefined or self-learning/Machine-learning) defining a tolerance or error-margin in the measurements provided from the sensors of the vehicle (e.g. cameras, radar, LiDAR, ultrasonic sensors, etc.). Thereby, the formed risk map 40 also accounts for uncertainties inherent in such measurements of the ego-vehicle's worldview caused by for example, sensor manufacturing tolerances, noise, and so forth. Accordingly, the whole risk estimation is rendered more accurate and reliable, more accurately reflecting the actual risk exposure of the ADS of the vehicle.

Figure 6:
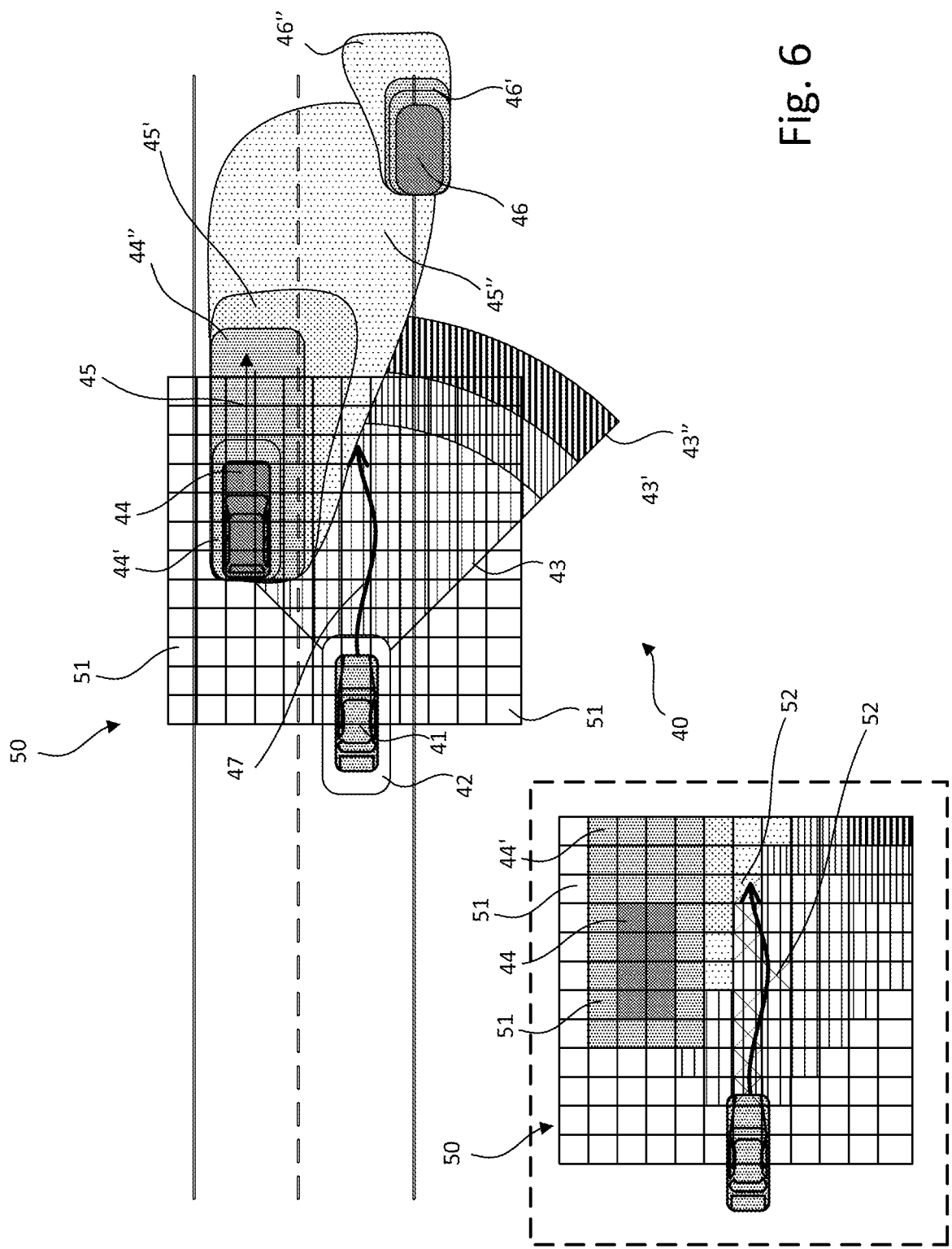
FIG. 6 is a schematic top view illustration of a risk map with area segments indicated in the form of a grid in accordance with an embodiment of the present invention.

FIG. 6 is a schematic top view illustration of a risk map at a subsequent time step/sample relative to the risk map depicted in FIG. 5, with area segments 51 indicated in the form of a grid 50 in accordance with an embodiment of the present invention. As described in the foregoing, in order to determine the total risk value of a candidate path 47, one may add together the risk values associated with the area segments that the planned path 47 intersects 52.

Figure 7:
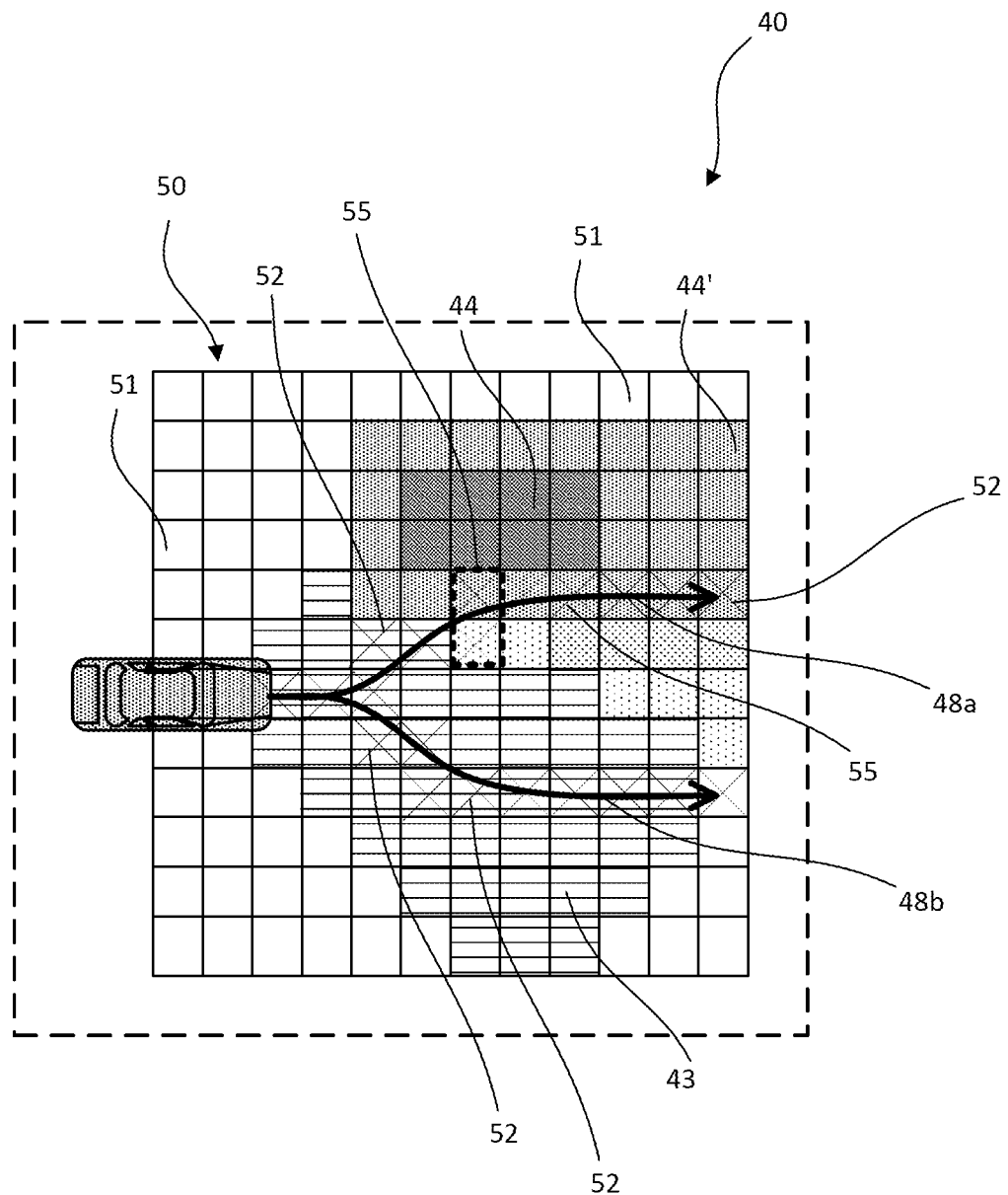
FIG. 7 is a schematic top view of a risk map in a grid framework illustrating some risk value estimation processes for a path in accordance with some embodiments of the present invention.

FIG. 7 shows a schematic top view of a risk map and serves to illustrate how the total risk value may be determined in accordance with some embodiments of the present invention. In more detail, FIG. 7 shows two candidate paths 48a, 48b extending through the risk map 40, which further has an overlaid grid framework 50 in order to exemplify how the area segments may be formed. As described in the foregoing, the risk map 40 has a plurality of area segments 51, each associated with a risk parameter indicative of at least one of a probability of an accident event if the path were to intersect an associated area segment and a probability of violating a predefined safety threshold. The "value" of the risk parameter is indicated in each box 51 by the pattern in the boxes 51. Accordingly, the risk map 40 depicts certain "high risk" area segments 44, "low risk" area segments 43, and values in between.

The risk of a candidate path 48a, 48b may be evaluated through one or more ways using the risk map 40. For example one may use the aggregated/compounded risk for the candidate path 48a, 48b when executed across the risk map 40 (i.e. integral of the path on the risk map). Accordingly, one may aggregate the risk values of the area segments 51 that the candidate path 48a, 48b intersects 52, in order to derive a compounded risk or average risk of the candidate path 48a, 48b.

Alternatively, or additionally, one may use the gradient of the risk map to assess the potential change of risk across the candidate path 48a, 48b. In more detail, one may analyse a risk gradient 55 of each candidate path, where the risk gradient 55 is indicative of a change in the risk parameters of adjacent area segments intersected 52 by each candidate path 48a, 48b. Thus, a high risk gradient 55 for a candidate path 48a, 48b may be construed as indicative of an elevated total risk value for that candidate path 48a, 48b. The risk gradient 55 may be used as complementary input to the compounded risk of a candidate path 48a, 48b. For example, two candidate paths may be associated with identical or similar aggregated/compounded risk values, but the risk gradients of both candidate paths may indicate that one path is "safer" than the other as it is associated with a lower risk gradient.

Moreover, the risk gradient 55 of a path may additionally be used as input in a preceding step to generate the paths. In more detail, one may generate paths based on the risk gradient, by for example making sure that the path is only allowed to evolve/extend along a risk gradient below some threshold in the risk map 40.

Alternatively, or additionally, one may use the highest risk zone of each candidate path 48a, 48b. In more detail, one may determine the area segment having the highest risk parameter intersected by each candidate path 48a, 48b in order to obtain a value of a highest risk zone entered by each candidate path. Using the highest risk zone as input to determine the total risk value of a candidate path 48a, 48b is a computationally efficient alternative, and further provides improvements with regards to occupant comfort. In more detail, even if a path is considered to be safe, it may be advantageous to avoid entering a "high risk zone" i.e. an area segment 51 on the risk map associated with an elevated risk value/parameter as it may be induce an unpleasant experience to the vehicle occupants. An unpleasant experience for a vehicle occupant may for example be an event that is perceived as dangerous by the occupant, e.g. if the ego-vehicle would drive too close to another vehicle.

Accordingly, in contrast to conventional path planning solutions relying on heuristic methods to make the safety assessment, the risk map provides an automatic tool for risk aware path planning, minimising the manual labour needed during development. Further, as the models for the surrounding world will necessarily be needed to be improved as the ADS increases its abilities so will the risk map, as it can be based on much of the same models that the ADS is relying upon. Moreover, when expanding into more complex operational situations the models need to be in place to allow the ADS to conduct itself there, so updated versions of the risk map will be readily available. Accordingly, a heuristic checker on the other hand would be needed to be updated and developed for each change to the operational domain making it difficult to maintain.

The risk map approach, as suggested herein, further provides a dynamic way of accounting for all the potential uncertainties of the environment as well as the vehicle's/ADS's own capabilities when evaluating the safety of a proposed path. In contrast to current methods, the risk map will incorporate information that allows for the risk to be dynamically estimated from all parts of the ADS including sensor, perception system as well as vehicle platform and actuators. This will not only allow the estimates from the risk map to be more accurate compared to static models, but it also enables the paths that are checked to account for more complex behaviours of the surrounding objects as well as to overcome some of the central problems surrounding uncertainties of the static models. The risk map brings the uncertainties from all the sources together to create one collective view of the risks. It accounts for uncertainties of sensor readings, perception system predictions, object models (scenario/behaviour models), and vehicle platform capabilities (braking, steering, etc.).

Figure 8:
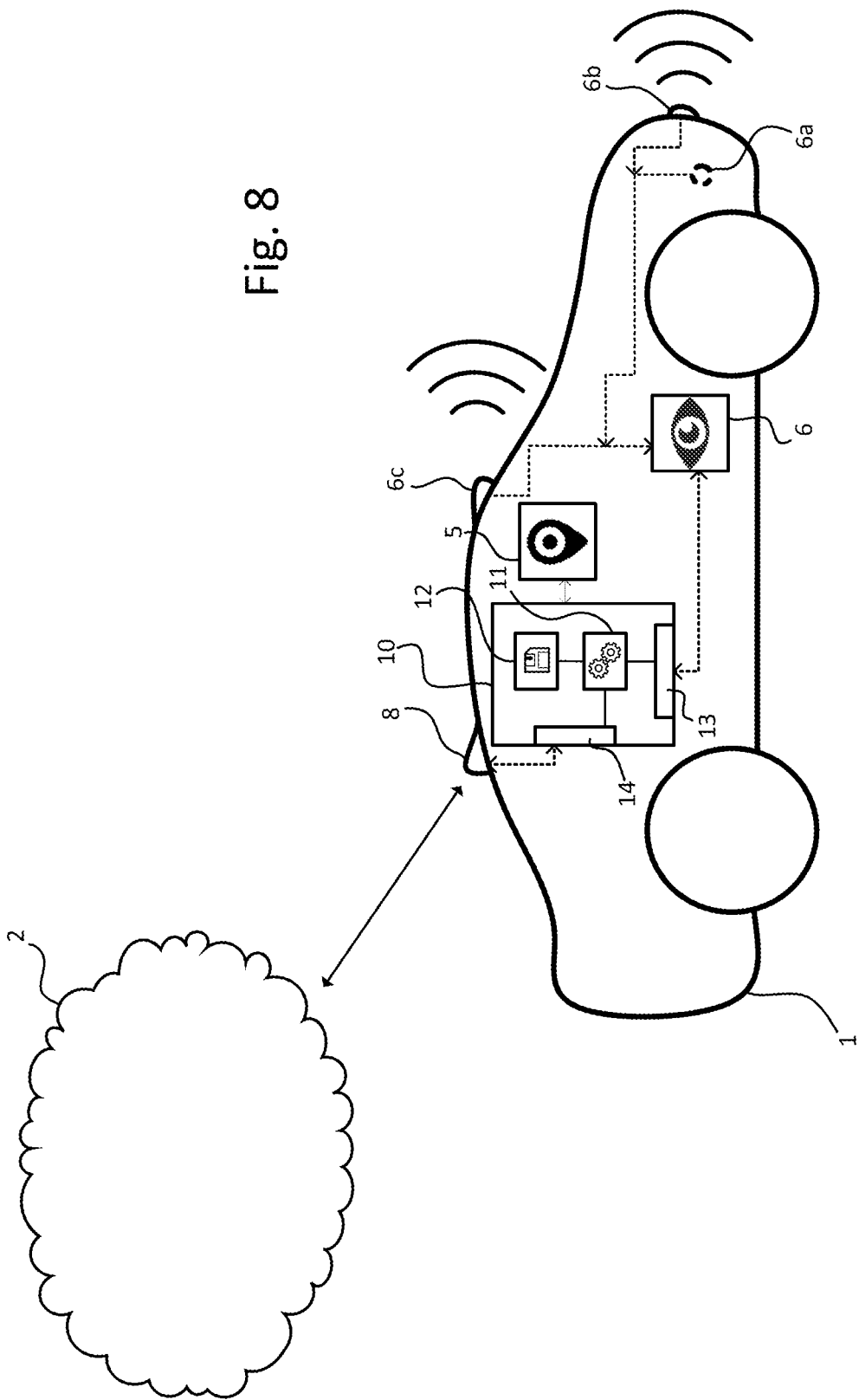
FIG. 8 is a schematic side view of a vehicle comprising a control system for identifying scenarios of interest for development, verification and/or validation an Automated Driving System (ADS) of a vehicle in accordance with an embodiment of the present invention.

FIG. 8 depicts a schematic side view of a vehicle 1 comprising a path planning system 10 in accordance with an embodiment of the present invention. The vehicle 1 further comprises an ADS, a perception system 6, and a localization system 5. A perception system 6 is in the present context to be understood as a system responsible for acquiring raw sensor data from on-board sensors 6a, 6b, 6c such as cameras, LIDARs and RADARs, ultrasonic sensors, and converting this raw data into scene understanding. The localization system 5 is configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy.

In more detail, the perception system 6 may refer to any commonly known system and/or functionality, e.g. comprised in one or more electronic control modules and/or nodes of the vehicle 1, adapted and/or configured to interpret sensory information—relevant for driving of the vehicle 1—to identify e.g. obstacles, vehicle lanes, relevant signage, appropriate navigation paths etc. The exemplified perception system 6 may thus be adapted to rely on and obtain inputs from multiple data sources, such as automotive imaging, image processing, computer vision, and/or in-car networking, etc., in combination with sensory information. Such exemplifying sensory information may for instance be derived from one or more optional surrounding detecting sensors 6a-c comprised in and/or provided on-board the vehicle 1. The surrounding detecting sensors 6a-c may be represented by any arbitrary sensors adapted to sense and/or perceive the vehicle's 1 surroundings and/or whereabouts, and may e.g. refer to one or a combination of one or more of radar, LIDAR, sonar, camera, navigation system e.g. GPS, odometer and/or inertial measurement units.

The system 10 comprises one or more processors 11, a memory 12, a sensor interface 13 and a communication interface 14. The processor(s) 11 may also be referred to as a control circuit 11 or control circuitry 11. The control circuitry 11 is configured to execute instructions stored in the memory 12 to perform a method for identifying scenarios of interest for development, verification and/or validation of an ADS of a vehicle 1 according to any one of the embodiments disclosed herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. The control system 10 is further provided with a communication interface 14 and a sensor interface 13.

The control circuitry 11 is configured to obtain a risk map of a surrounding environment of the vehicle based on an actuation capability of the vehicle and a location of free-space areas in the surrounding environment. The actuation capability includes an uncertainty estimation for the actuation capability and the location of free-space areas comprises an uncertainty estimation for the estimated location of free-space areas. The risk map comprises a risk parameter for each of a plurality of area segments comprised in the surrounding environment of the vehicle. Further, the control circuitry 11 is configured to obtain at least one candidate path for the vehicle/ADS and to determine a total risk value for each candidate path based on the risk parameters of a set of area segments intersected by each candidate path. Further, the control circuitry 11 is configured to select a candidate path, of the at least one candidate path, fulfilling a risk value criterion and to generate, at an output, a first signal indicative of the selected candidate path.

Further, the vehicle 1 may be connected to external network(s) 2 via for instance a wireless link (e.g. for retrieving HD map data). The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 may be or include any number of hardware components for conducting data or signal processing or for executing computer code stored in memory 12. The control system 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry 6 in the vehicle. The communication/antenna interface 14 may further provide the possibility to send output to a remote location (e.g. remote operator or control centre) by means of the antenna 8. Moreover, some sensors in the vehicle may communicate with the control device 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, sensor data may be sent to an external system and that system performs the steps to compile or render the risk map. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

It will also be understood that, although the term first, second, etc. may be used herein to describe various elements, these elements should not be limited by these terms. These terms are only used to distinguish one element from another. For example, a first action could be termed a second action, and, similarly, a second action could be termed a first action, without departing from the scope of the embodiments.

Although the figures may show a specific order of method steps, the order of the steps may differ from what is depicted. In addition, two or more steps may be performed concurrently or with partial concurrence. For example, the steps of obtaining the actuation capability and the location of free-space areas may be interchanged based on a specific realization. Such variation will depend on the software and hardware systems chosen and on designer choice. All such variations are within the scope of the invention. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

What is claimed is:

1. A computer implemented path planning method for an automated driving system (ADS) of a vehicle, the method comprising:
    obtaining a risk map of a surrounding environment of the vehicle, wherein the risk map is formed based on an actuation capability of the vehicle and a location of free-space areas in the surrounding environment, wherein the actuation capability including an uncertainty estimation for the actuation capability, and wherein the location of free-space areas comprising an uncertainty estimation for the location of free-space areas,
    wherein the risk map comprises a risk parameter for each of a plurality of area segments comprised in the surrounding environment of the vehicle;
    obtaining, based on the risk map, at least one candidate path for the ADS;
    determining a total risk value for each candidate path for the ADS based on risk parameters of a set of area segments intersected by the at least one path;
    selecting a candidate path, of the at least one candidate path, fulfilling a risk value criterion;
    generating, at an output, a first signal indicative of the selected candidate path to be executed by the ADS; and
    executing the selected candidate path by the ADS,
    wherein the step of obtaining the at least one candidate path comprises: generating at least one path from a starting position of the vehicle to a goal position of the vehicle, each generated path having a set of quality parameters; and comparing the quality parameters of each path with a set of quality criteria in order to generate at least one candidate path having a set of quality parameters fulfilling the set of quality criteria,
    wherein the risk value criterion is a maximum risk value threshold and the set of quality parameters of each candidate path are indicative of a quality score of each candidate path, and
    wherein the step of selecting the candidate path fulfilling the risk value criterion comprises selecting the candidate path having the highest quality score and having a total risk value below the maximum risk value threshold.

2. The method according to claim 1, further comprising:
    determining a back-up path from the at least one candidate path, the back-up path having the lowest total risk value relative to any other candidate path of the at least one candidate path; and
    generating, at an output, a second signal indicative of the determined back-up path.

3. The method according to claim 1, further comprising:
    if no candidate path is fulfilling the risk value criterion, generating, at an output, a request signal indicative of a request for new candidate paths.

4. The method according to claim 1, wherein the step of determining the total risk value for each candidate path comprises:
    aggregating the risk parameters of the set of area segments intersected by each candidate path; and
    determining the total risk value for each candidate path based on the aggregated risk parameters.

5. The method according to claim 1, wherein the step of determining the total risk value for each candidate path comprises:
    analysing a risk gradient of each candidate path, the risk gradient being indicative of a change in the risk parameters of adjacent area segments intersected by each candidate path; and determining the total risk value for each candidate path based on the analysed risk gradient.

6. The method according to claim 1, wherein the step of determining the total risk value for each candidate path comprises:
    determining the area segment having the highest risk parameter intersected by each candidate path, in order to obtain a value of a highest risk zone entered by each candidate path; and
    determining the total risk value for each candidate path based on the obtained value of the highest risk zone entered by each candidate path.

7. The method according to claim 1, wherein each risk parameter is indicative of at least one of a probability of an accident event if a candidate path were to intersect an associated area segment and a probability of violating a predefined safety threshold if a candidate path were to intersect an associated area segment.

8. The method according to claim 1, wherein the location of free-space areas comprises:
    a position of external objects located in the surrounding environment of the vehicle, and wherein the position of the external objects includes uncertainties of the position of the external objects, trajectories of any dynamic objects of the external objects and uncertainties of the trajectories of the dynamic objects.

9. A non-transitory computer-readable storage medium storing one or more instructions configured to be executed by one or more processors of an in-vehicle processing system, the one or more instructions for performing the method according to claim 1.

10. A path planning system for an automated driving system (ADS) of a vehicle, the path planning system comprising control circuitry configured to:
    obtain a risk map of a surrounding environment of the vehicle, wherein the risk map is based on an actuation capability of the vehicle and a location of free-space areas in the surrounding environment, wherein the actuation capability including an uncertainty estimation for the actuation capability, and wherein the location of free-space areas comprising an uncertainty estimation for the location of free-space areas,
    wherein the risk map comprises a risk parameter for each of a plurality of area segments comprised in the surrounding environment of the vehicle;
    obtain, based on the risk map, at least one candidate path for the ADS;
    determine a total risk value for each candidate path for the ADS based on risk parameters of a set of area segments intersected by each candidate path;
    select a candidate path, of the at least one candidate path, fulfilling a risk value criterion;
    generate, at an output, a first signal indicative of the selected candidate path to be executed by the ADS; and
    execute the selected candidate path by the ADS,
    wherein obtaining the at least one candidate path comprises: generating at least one path from a starting position of the vehicle to a goal position of the vehicle, each generated path having a set of quality parameters; and comparing the quality parameters of each path with a set of quality criteria in order to generate at least one candidate path having a set of quality parameters fulfilling the set of quality criteria,
    wherein the risk value criterion is a maximum risk value threshold and the set of quality parameters of each candidate path are indicative of a quality score of each candidate path, and
    wherein selecting the candidate path fulfilling the risk value criterion comprises selecting the candidate path having the highest quality score and having a total risk value below the maximum risk value threshold.

11. A vehicle comprising:
    an Automated Driving System, ADS;
    a perception system comprising at least one sensor configured to monitor a surrounding environment of the vehicle;
    a vehicle control system comprising at least one sensor configured to monitor an actuation capability of the vehicle;
    a localization system comprising at least one sensor configured to monitor a geographical map position of the vehicle;
    a path planning system comprising control circuitry configured to:
    obtain a risk map of a surrounding environment of the vehicle, wherein the risk map is based on an actuation capability of the vehicle and a location of free-space areas in the surrounding environment, wherein the actuation capability including an uncertainty estimation for the actuation capability, and wherein the location of free-space areas comprising an uncertainty estimation for the location of free-space areas,
    wherein the risk map comprises a risk parameter for each of a plurality of area segments comprised in the surrounding environment of the vehicle;
    obtain, based on the risk map, at least one candidate path for the ADS;
    determine a total risk value for each candidate path for the ADS based on risk parameters of a set of area segments intersected by each candidate path;
    select a candidate path, of the at least one candidate path, fulfilling a risk value criterion;
    generate, at an output, a first signal indicative of the selected candidate path to be executed by the ADS; and
    execute the selected candidate path by the ADS,
    wherein obtaining the at least one candidate path comprises: generating at least one path from a starting position of the vehicle to a goal position of the vehicle, each generated path having a set of quality parameters; and comparing the quality parameters of each path with a set of quality criteria in order to generate at least one candidate path having a set of quality parameters fulfilling the set of quality criteria,
    wherein the risk value criterion is a maximum risk value threshold and the set of quality parameters of each candidate path are indicative of a quality score of each candidate path, and
    wherein the step of selecting the candidate path fulfilling the risk value criterion comprises selecting the candidate path having the highest quality score and having a total risk value below the maximum risk value threshold.

* * * * *